United States Patent
Vieux

(10) Patent No.: US 9,067,088 B2
(45) Date of Patent: Jun. 30, 2015

(54) DEVICE FOR ADJUSTING THE LENGTH OF A FLEXIBLE LINK AND USE THEREOF IN A COMFORT HOUSING FOR A HARNESS STRAP

(75) Inventor: Patrick Vieux, Rosieres Pres Troyes (FR)

(73) Assignee: TRACTEL SAS, Saint-Hilaire-Sous-Romilly (FR)

( * ) Notice: Subject to any disclaimer, the term of this patent is extended or adjusted under 35 U.S.C. 154(b) by 946 days.

(21) Appl. No.: 13/203,362

(22) PCT Filed: Feb. 25, 2010

(86) PCT No.: PCT/FR2010/050333
§ 371 (c)(1),
(2), (4) Date: Aug. 25, 2011

(87) PCT Pub. No.: WO2010/097555
PCT Pub. Date: Sep. 2, 2010

(65) Prior Publication Data
US 2011/0302688 A1    Dec. 15, 2011

(30) Foreign Application Priority Data
Feb. 27, 2009   (FR) ...................................... 09 51280

(51) Int. Cl.
| B63B 21/00 | (2006.01) |
| B60D 1/18 | (2006.01) |
| F16F 6/00 | (2006.01) |
| A62B 35/00 | (2006.01) |
| A44B 11/04 | (2006.01) |
| B60R 22/30 | (2006.01) |

(52) U.S. Cl.
CPC ......... *A62B 35/0031* (2013.01); *Y10T 24/4047* (2015.01); *Y10T 24/316* (2015.01); *A44B 11/04* (2013.01); *A62B 35/0025* (2013.01); *B60R 22/30* (2013.01)

(58) Field of Classification Search
CPC .. B63B 2021/005; F16F 2236/06; F16F 1/46; B60D 1/182; B60P 7/0823; Y10T 24/314; Y10T 24/316; Y10T 24/318
USPC ............ 24/68 CD, 71.1, 68 R; 267/69, 71–74
See application file for complete search history.

(56) References Cited

U.S. PATENT DOCUMENTS

| 4,754,957 | A | * | 7/1988 | Muttart .......................... 267/136 |
| 5,402,557 | A | * | 4/1995 | Dalen ......................... 24/68 CD |
| 2004/0095004 | A1 | | 5/2004 | Horton et al. |

FOREIGN PATENT DOCUMENTS

| DE | 24 19 193 A1 | 11/1975 |
| DE | 41 05 725 C1 | 5/1992 |
| EP | 0 629 530 A2 | 12/1994 |
| EP | 0 902 710 B1 | 7/2001 |
| WO | 98/13104 A1 | 4/1998 |

OTHER PUBLICATIONS

International Search Report, dated May 6, 2010, from corresponding PCT application.

* cited by examiner

*Primary Examiner* — Jack W Lavinder
(74) *Attorney, Agent, or Firm* — Young & Thompson

(57) ABSTRACT

A device for adjusting the length of a flexible link according to the pulling force exerted on the link, the continuous link passing through the device between two substantially opposite input/output ends of the device. The device includes elements for producing at least one link loop whose extent can vary according to the pulling force, at least one return element tending to increase the extent of the loop up to a predefined maximum in the absence of pulling force on the link and which corresponds to a reduction of the apparent length of the link on which the device is placed, the pulling force of the link resulting in a reduction of the extent of the loop up to a predefined minimum and which corresponds to an elongation of the apparent length of the link on which the device is placed. Devices with S loop or omega loop are described together with a comfort unit for a strap harness.

Figure 1:
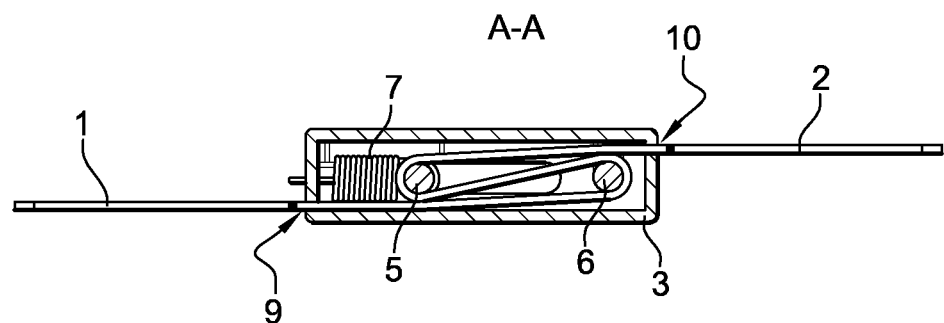

11 Claims, 8 Drawing Sheets ered with this device, is apparent length of a flexible link. It has various applications,

DEVICE FOR ADJUSTING THE LENGTH OF A FLEXIBLE LINK AND USE THEREOF IN A COMFORT HOUSING FOR A HARNESS STRAP

The present invention relates to a device for adjusting the apparent length of a flexible link. It has various applications, particularly in the field of safety and more particularly the retention of people or loads to protect them from falling. It can even be applied to the stopping of moving objects or people, lifelines, retention lines, etc. An application with a comfort unit for strap, notably for safety harness, is described.

In the context of anti-fall devices for people working at heights, harnesses are used which are worn by the people and linked to lifelines. This type of harness must be adjusted tight enough to prevent it from coming undone from the person who is falling. However, such adjustment limits the movement possibilities of the person or creates a hindrance. The application EP 0 902 710 has therefore proposed using a harness which is made of a material which has a certain elasticity under low stress but with a limit which is such that, in a fall stopping situation, therefore under high stress, the harness has a non-elastic behavior allowing for effective retention. Such a harness therefore has both comfort characteristics by not excessively limiting the normal movements of the person and safety characteristics by having a favorable fall-stopping behavior.

This type of harness does, however, present certain drawbacks. For example, in the case where elastic materials are used in the harness, a degradation of the mechanical properties may occur over time even in the absence of excessive stress because of physical/chemical aging processes. Furthermore, this type of harness is more complex and costly to produce than a conventional harness made of a material that does not have elastic properties.

Mechanical adjustment devices are also known from the applications DE 2419193, EP 0 629 530 and US 2004/095004. However, these devices have certain limitations such as, in particular, the irreversibility or absence of displacement of deflection axes.

In general terms, the invention relates to a mechanical device which makes it possible to adjust the apparent length of a flexible link, said link being able to be cylindrical like a halyard or being able to be flat like a strap. For this, the link passes into the device by forming at least one loop which may be more or less extended according to the pulling force exerted on the link, a return means tending to increase the extent of the loop and therefore reduce the apparent length of the link in the absence of pulling force on said link being used. The result of this is that the link with the device of the invention exhibits a behavior at least of extension, and preferably a behavior which is elastic overall, that is apparent even though the link in itself can have no intrinsic extendibility or elasticity characteristic. And even, preferably, the link does not exhibit any specific elasticity property and is practically inextendable. The invention is particularly advantageous in safety applications.

Thus, the invention relates to a device for adjusting the length of a flexible link according to the pulling force exerted on said link, said continuous link passing through the device between two substantially opposite input/output ends of said device.

According to the invention, the device includes means for producing at least one link loop whose extent can vary according to the pulling force, at least one return means tending to increase the extent of said loop up to a predefined maximum in the absence of pulling force on said link and which corresponds to a reduction of the apparent length of the link on which the device is placed, the pulling force of the link resulting in a reduction of the extent of the loop up to a predefined minimum and which corresponds to an elongation of the apparent length of the link on which the device is placed.

In various embodiments of the invention, the means described, being able to be used alone or in all technically possible combinations, are employed and in particular:
  the device has only one loop,
  the loop is substantially flat,
  the substantially flat loop extends in a substantially extended plane between the two input/output ends of the device,
  the loop is substantially flat and extends in a substantially extended plane between the two input/output ends of the device,
  the link is a textile link or a non-textile link,
  the non-textile link is metallic (single- or multi-stranded)
  the non-textile link is made of a synthetic material (single- or multi-stranded),
  the textile link is a woven or a nonwoven fabric,
  the link is made of a synthetic material, notably nylon, polyamide, polyester, etc., or their combinations,
  the link is made of a natural material, notable fibers of linen, cotton, hemp, etc., or their combinations,
  the link is a composite link,
  the link is a textile and non-textile composite link,
  the link is a woven and nonwoven fabric composite link,
  the link is a composite link of synthetic and natural materials,
  the link in itself is non-elastic when it is pulled,
  the link in itself exhibits a behavior at least partially elastic when it is pulled,
  the link in itself exhibits an elastic behavior at the start of pulling force and then a non-elastic behavior thereafter,
  the link is flat (=strap),
  the link is cylindrical,
  the cylindrical link is a loom
  in the case of a cylindrical link, the deflection axes include grooves,
  in the case of a cylindrical link, the deflection axes including grooves are pulleys,
  the link is chosen from cylindrical links or flat links (=straps),
  the link is flat and the loop is open,
  the loop is open (preferably for a flat link),
  the loop is closed (easy to produce for a cylindrical link for which the offset between the two ends of the loop is at least equal to the diameter of the link),
  the device includes, for each loop, at least two link deflection axes, at least one of the axes being mobile in translation and being functionally attached to said at least one return means,
  the return means is elastic,
  the return means has shape memory (block of rubber for example),
  the return means has dimension memory,
  the return means is a block of elastic material,
  the return means is a spring,
  the spring works by extension (at the maximum extent of the loop, the spring(s) is/are of reduced length, turns close together, and at the minimum extent of the loop, the spring(s) is/are of increased length, extended, turns wide apart),
  the spring works by compression (at the maximum extent of the loop, the spring(s) is/are of increased length, turns wide apart, and at the minimum extent of the loop, the spring(s) is/are of reduced length, turns close together), the return means is a spring and the spring works by extension: the pulling force of the link which results in a reduction of the extent of the loop causing an extension of the spring, the return means is a spring and the spring works by compression: the pulling force of the link which results in a reduction of the extent of the loop causing a compression of the spring, each of the two deflection axes returns the link in a direction opposite to that of the other axis, at least one of the deflection axes is mobile in rotation (the deflection axis immobilized in translation and/or the deflection axis/axes mobile in translation), the device includes an S loop, a first deflection axis of the link being immobilized in translation and a second deflection axis being mobile in translation and functionally attached to said at least one return means, the return means acting between one or more fixed points of the device and the second deflection axis, the device includes an omega loop, a first deflection axis of the link being mobile in translation and functionally attached to a first of said at least one return means, and a second deflection axis being mobile in translation and functionally attached to a second of said at least one return means, and in the case where the first and the second at least one return means are independent, said return means act respectively between one or more fixed points of the device and their corresponding deflection axis, and in the case where the first and the second at least one return means are at least one and the same return means, said return means act between the first and second deflection axes.

the device with omega loop also includes a reaction plate or two fixed omega deflection axes (the two ends of the reaction plate have the same link return function as the two fixed omega deflection axes), the deflection axis that is mobile in translation is in this position along at least one translation path of the device, the device includes two parallel and opposite translation paths for each deflection axis mobile in translation, said translation paths receiving the two opposite ends of the deflection axis that is mobile in translation, the end or ends of the translation path corresponding to the predefined minimum extent of the loop has/have (an) end stop(s), the device includes two parallel and opposite translation paths for each deflection axis mobile in translation, said translation paths receiving the two opposite ends of the deflection axis in order to allow mobility with translational guidance of said deflection axis, the device comprises a substantially flat unit, the loop being arranged inside said unit.

The invention also relates to an application of the device of the invention to the production of a comfort unit for harness strap, notably for safety.

In miscellaneous variants, said comfort unit has one or more of the characteristics described, namely:

the unit is formed by a frame and its main faces are essentially open ("skeleton" unit), the unit is essentially closed (it has physical walls on its main faces), the unit is made of rigid material, the unit is made of plastic or metallic or composite material, the unit consists of two shells joined together, in particular by snap-fitting and/or welding and/or screwing, each of the shells forming one of the two main faces of said unit, at least one of the input/output ends of the link is produced between two opposite edges belonging respectively to the two shells, at least one of the input/output ends of the link is produced in the form of an orifice in a side wall of one of the two shells (shell input/output end wall orifice), the passage dimensions for the input/output ends of the link are slightly greater than those of the link in order to produce a guidance for said link (to prevent, for example in the case of a flat link for which the pulling force is not axial, folds or a winding on itself of the link from snagging in the device), the unit is substantially flat, at least one of the main faces of the unit is incurved concave for adaptation to the shoulder of the wearer of the harness, the comfort unit is slightly incurved for adaptation to the shoulder of the wearer of the harness.

The invention relates to or also exhibits the following characteristics:

a device that makes it possible to vary the distance between the two ends of a link such as a strap or rope, forming a loop, in the form of a frame and having two transversal axes linked at their ends to said frame and on which said link is wound successively in an "S" shaped travel, such that at least one of the two axes is linked to said frame by a return means so as to allow a displacement of this axis in the direction of the longitudinal axis of the link, automatically and permanently under the effect of a pulling force exerted on one or both ends of the link, a device such that the return means between the mobile axis and the frame is arranged so as to work by compression, a device such that the return means between the mobile axis and the frame is arranged so as to work by extension, a device such that the return means linking the mobile axis to the frame is attached to one of the longitudinal ends of the frame on the axis of the link, a device such that the return means linking the mobile axis to the frame comprises two parts respectively attached to the side parts of the frame, a device such that the ends of the mobile axis slide in an oblong opening respectively formed in each of the two side parts of the frame providing a guidance function for these axes and a function for limiting their travel, the return means consists of elastic material, the return means consists of material with shape memory, the return means consists of material with dimension memory, the return means consists of at least one block of elastic material, the return means consists of at least one spring, a device such that it is arranged at the end of the link for which it links this end to a mooring means, the loop of the device is produced with a rigid strap forming part of a harness, the extendibility, even elasticity, contributed by the loop device being calculated so as to ensure ease of movement for the person wearing the harness by elongation of the distance between the two ends of the strap and said loop being arranged at the appropriate place or places for this purpose, the loop is arranged on an elastic strap so as to complement the elasticity of this strap, the two axes are mobile under the effect of a return means.

The invention applies in particular to a harness worn by a user, said harness being able to include straps, in particular shoulder straps, on which adjustment devices are placed. The harnesses are conventional harnesses such as harnesses for babies, for airplane or boat pilots, for automobile or heavy vehicle drivers, for animals, etc., or safety harnesses, in particular anti-fall harnesses. The invention also applies to a link linked to a user provided with a harness or other fixation means (for example lifeline, dog lead, or similar type of link), an adjustment device being placed on said link.

The invention finally relates to a strap harness, such that at least one of the straps includes a device for adjusting the link length according to one or more of the characteristics described, said device being in a unit (the device is called "comfort unit"), and including means for producing at least one strap loop whose extent can vary according to the pulling force on the strap, at least one return means tending to increase the extent of said loop up to a predefined maximum in the absence of pulling force on said strap and which corresponds to a reduction of the apparent length of the strap on which the device is placed, the pulling force of the strap resulting in a reduction of the extent of the loop up to a predefined minimum and which corresponds to an elongation of the apparent length of the strap on which the device is placed.

Figure 2:
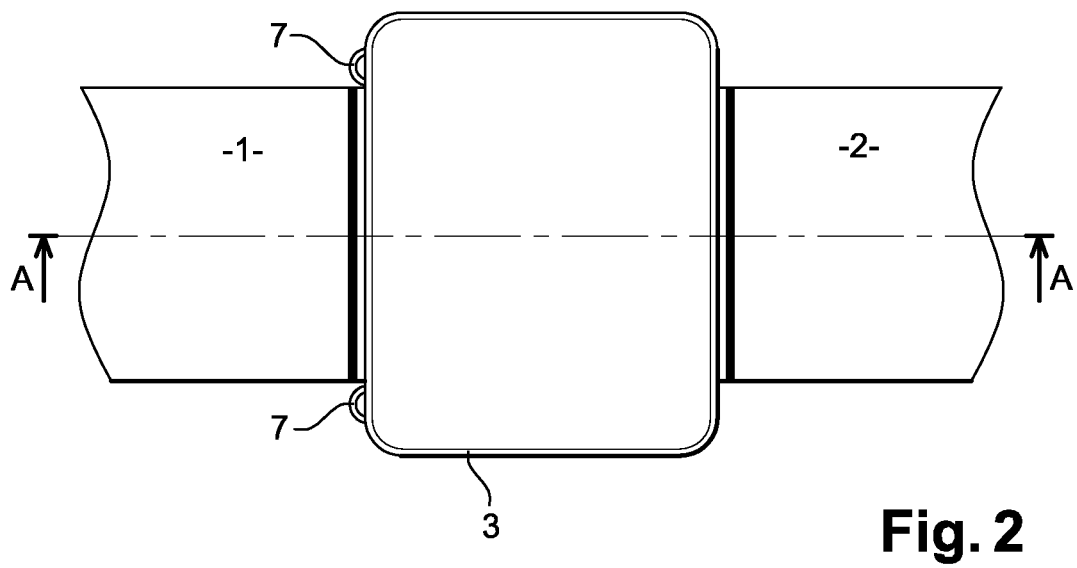
Figure 3:
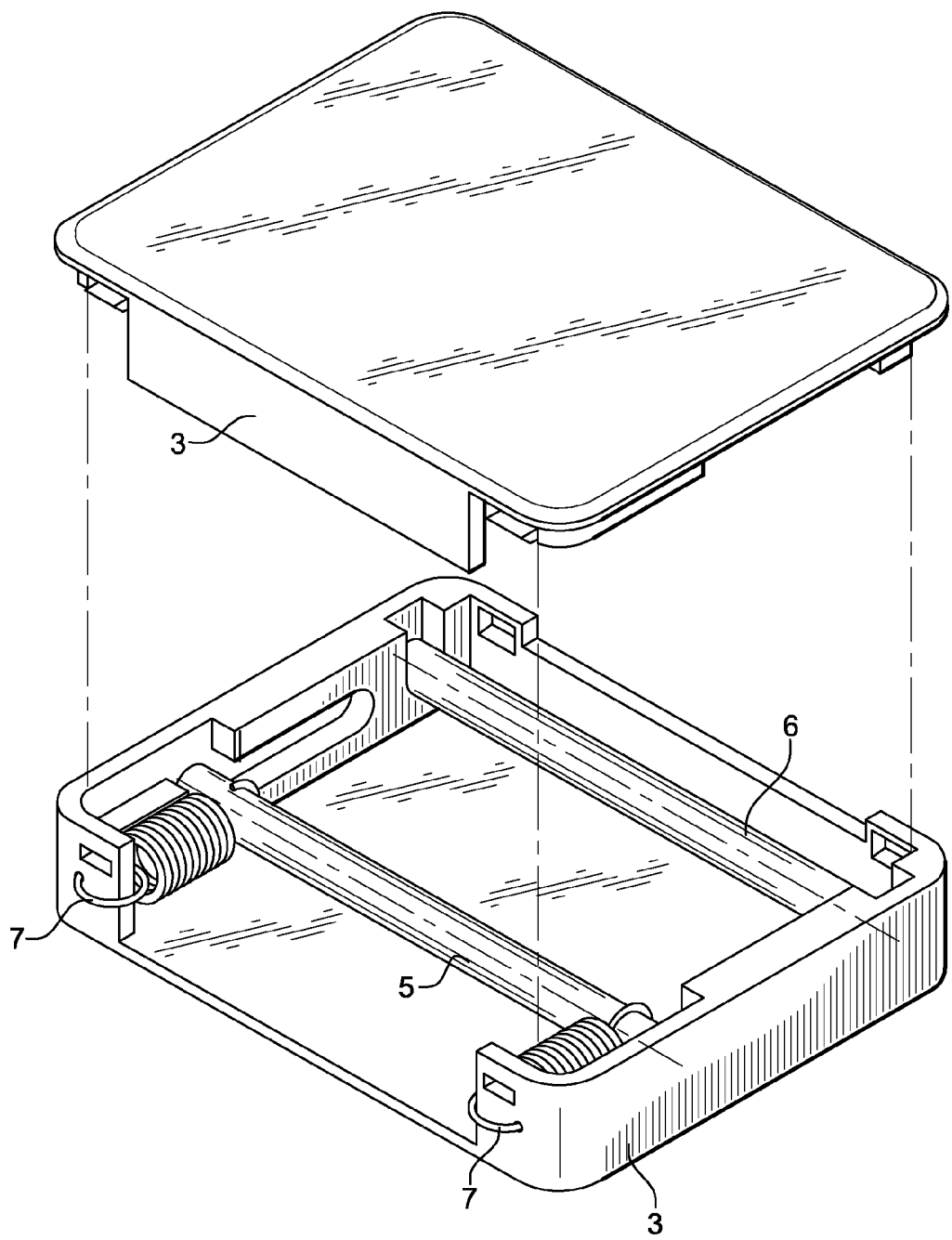
Figure 4:
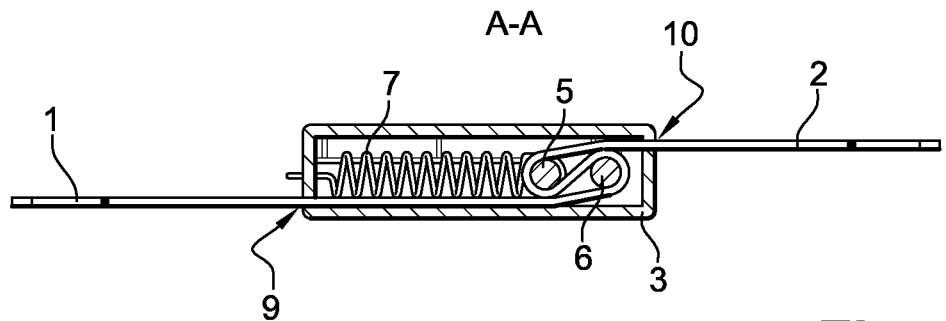
Figure 5:
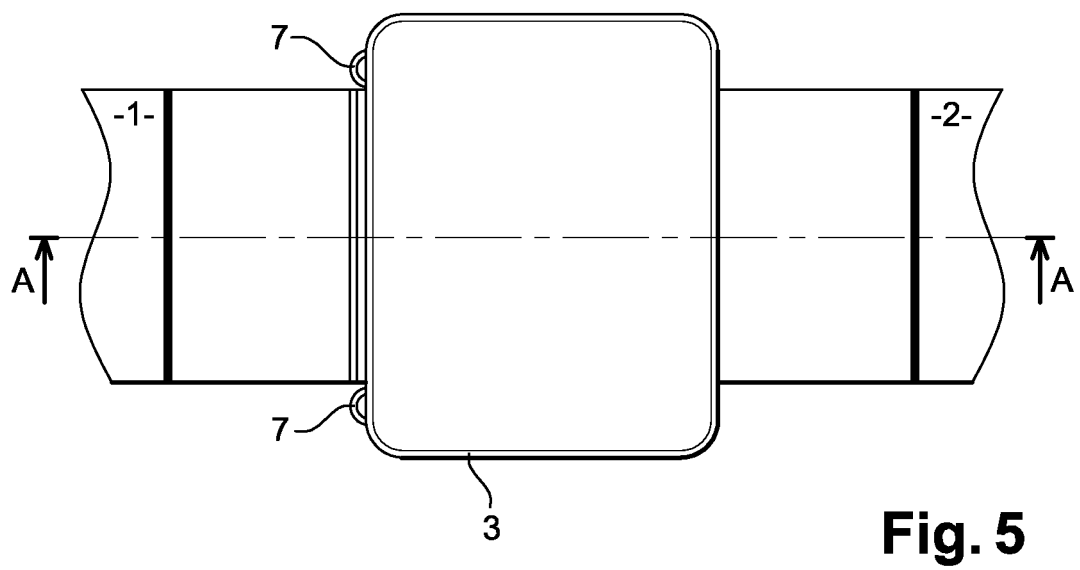
Figure 6:
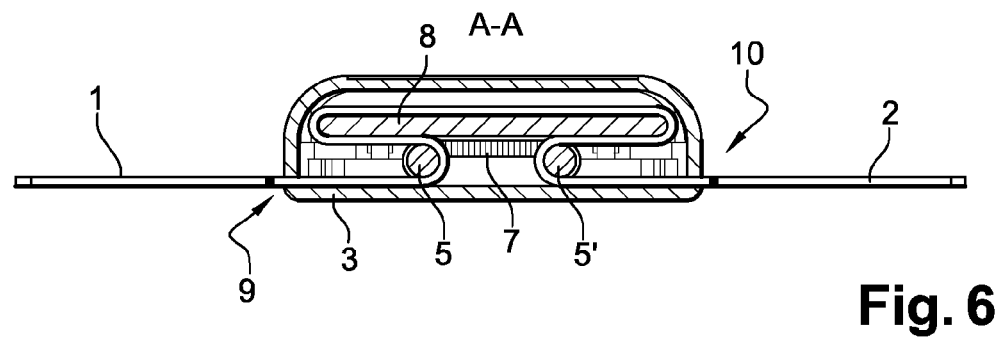
Figure 7:
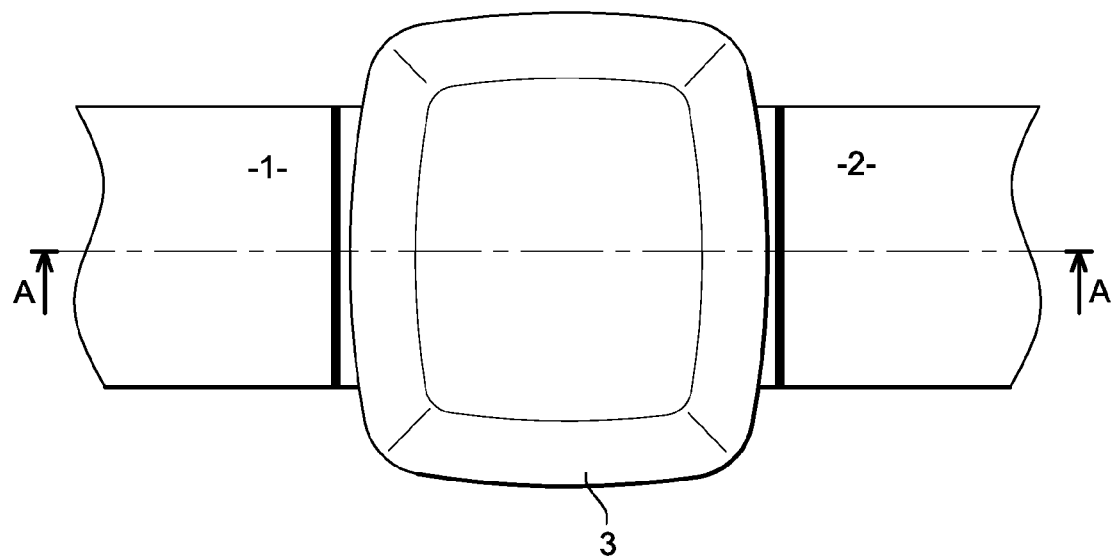
Figure 8:
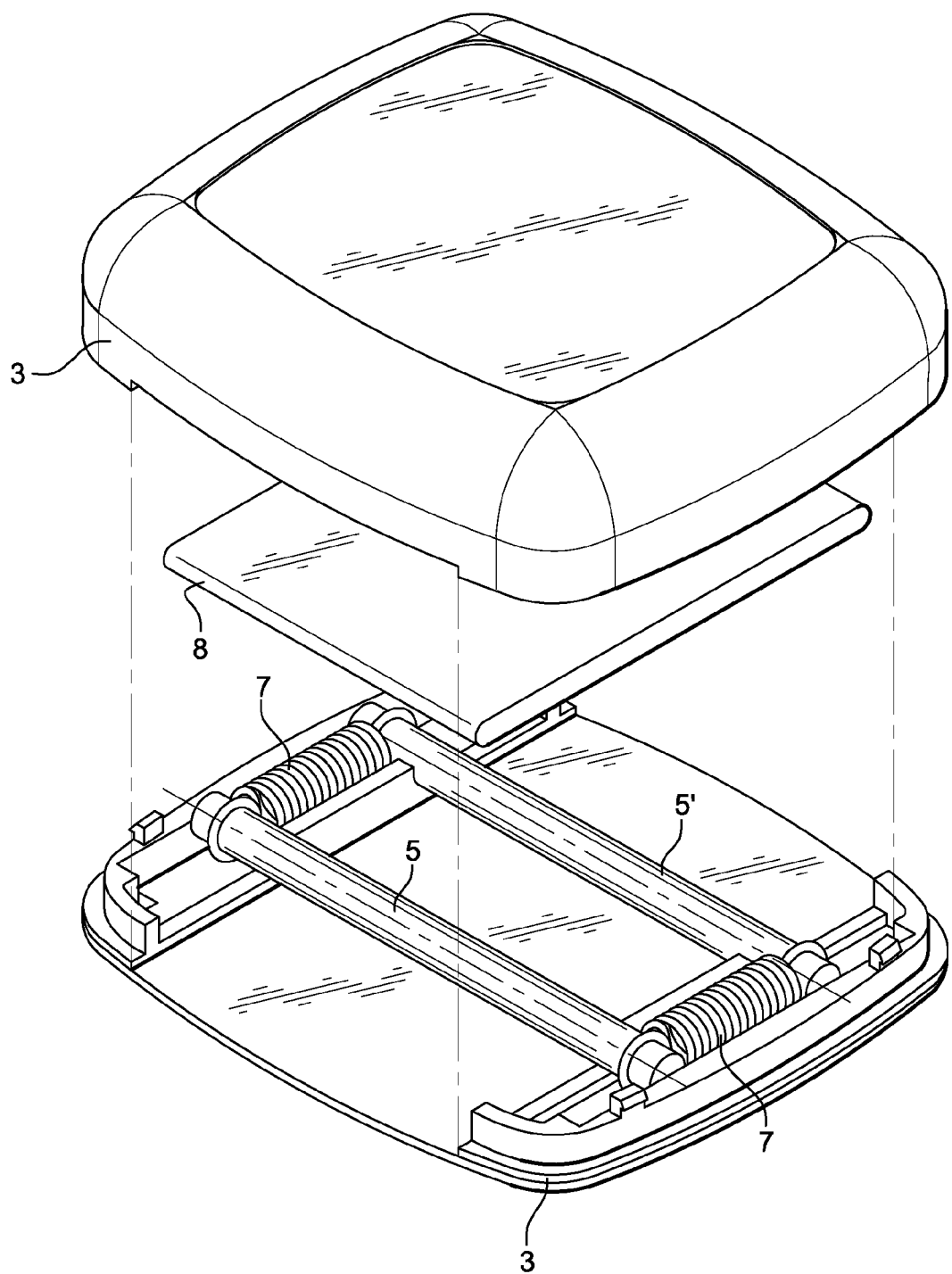
Figure 9:
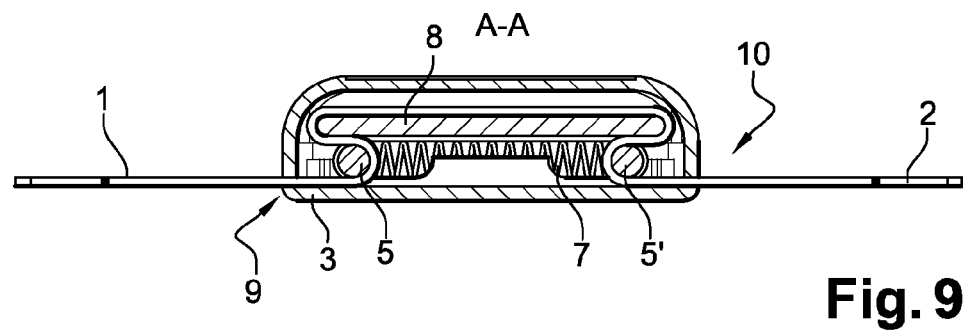
Figure 10:
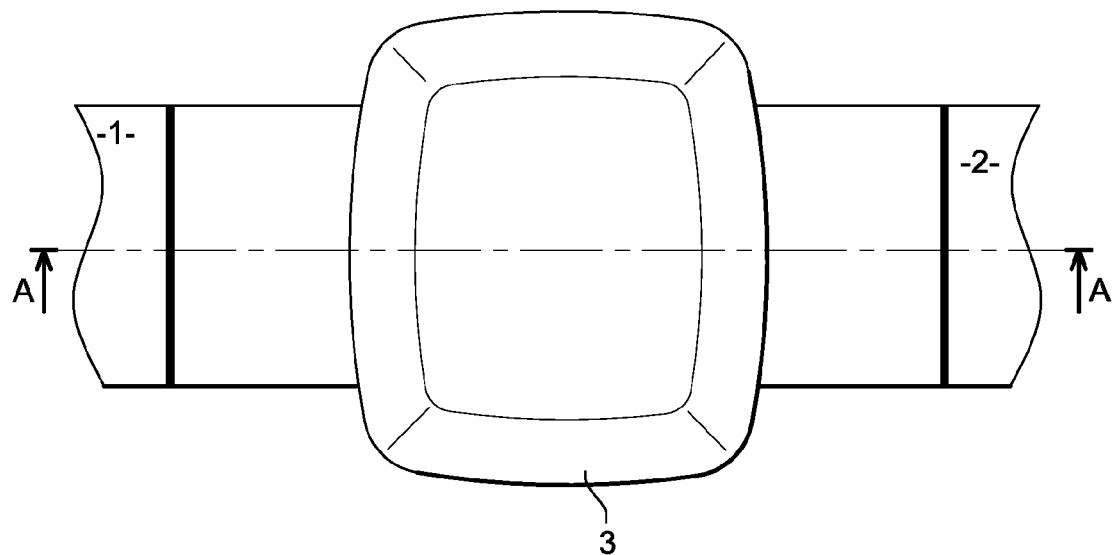
Figure 11:
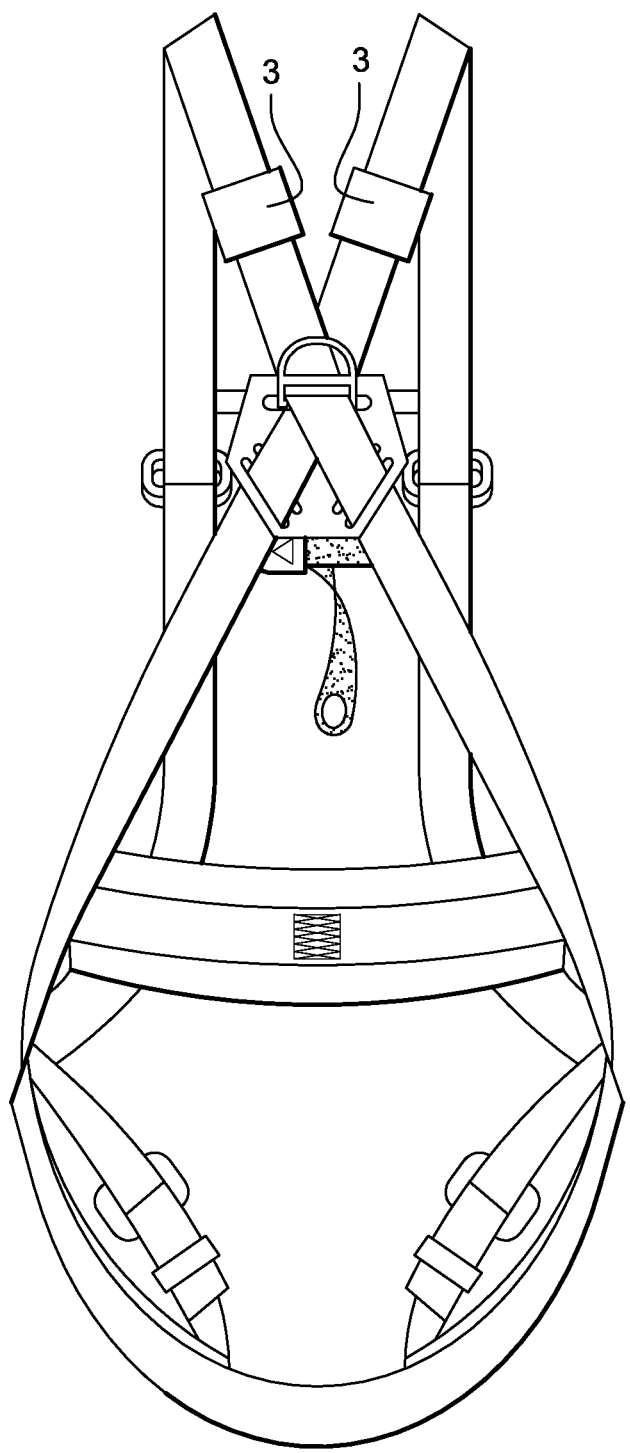
Figure 12:
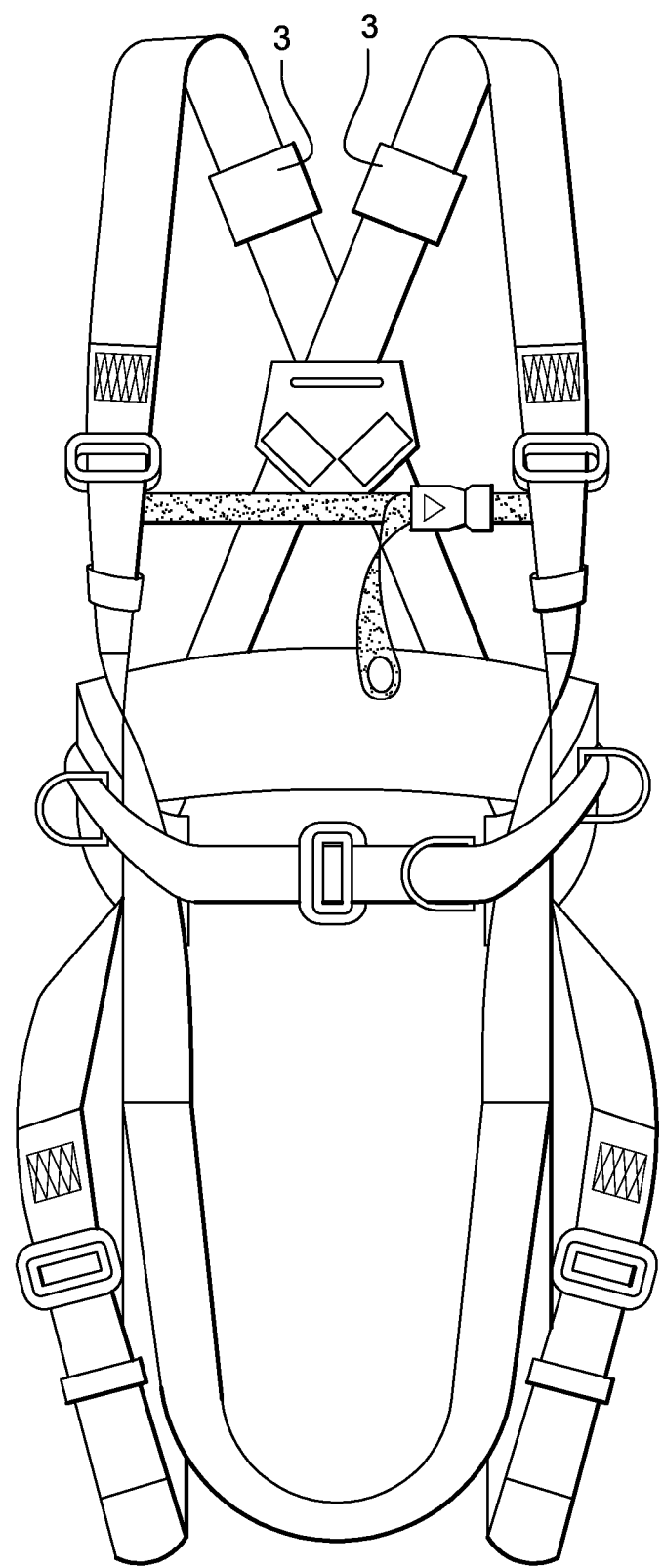

The present invention, without in any way being limited, will now be exemplified with the following description of embodiments and implementations in relation to:

FIG. 1 which is a cross-sectional side view of a first exemplary comfort unit (S loop) for a strap when idle, not subject to any pulling force, FIG. 2 which is a front view of a first exemplary comfort unit for a strap when idle, not subject to any pulling force, FIG. 3 which is an exploded perspective view of a first exemplary comfort unit, without its strap, FIG. 4 which is a cross-sectional side view of a first exemplary comfort unit for a strap subject to a pulling force, FIG. 5 which is a front view of a first exemplary comfort unit for a strap subject to a pulling force, FIG. 6 which is a cross-sectional side view of a second exemplary comfort unit (omega loop) for a strap when idle, not subject to any pulling force, FIG. 7 which is a front view of a second exemplary comfort unit for a strap when idle, not subject to any pulling force, FIG. 8 which is an exploded perspective view of a second exemplary comfort unit, without its strap, FIG. 9 which is a cross-sectional side view of a second exemplary comfort unit for a strap subject to a pulling force, FIG. 10 which is a front view of a second exemplary comfort unit for a strap subject to a pulling force, FIG. 11 which is a back view of a safety harness including comfort units on its shoulder straps in their dorsal parts, FIG. 12 which is a front view of the safety harness of FIG. 11.

In these figures, the comfort unit of the first example contains an S loop of the strap on the inside and in the second example, an omega loop. FIGS. 1, 2, 4-7, 9, 10 show fixed markers (black lines) in the strap on either side of the comfort unit in order to show the effect of a pulling force and of a relaxation (idle/absence of pulling force) on said strap.

The comfort unit for the harness strap which will be described more particularly in detail hereinbelow contributes at least one elongation characteristic to the strap which uses it in order to guarantee the wearer of the harness a certain usage comfort.

The comfort unit can be positioned on the shoulder straps in order to ensure freedom of movement for the upper part of the body. More generally, the comfort unit may also be positioned at any other point on a harness strap that might improve the usage comfort of a harness. The comfort unit can be placed in line on a strap of given width and no damaging intervention is required to place the unit on the strap. In particular, the strap does not have to be cut or modified in any other way. The fitting of the comfort unit does not in any way affect the original mechanical strength of the strap.

The elongation effect contributed by the use of the comfort unit is obtained by the combination of a strap trajectory linked to the bypassing of (a) mobile and/or fixed deflection axis or axes and of a possible reaction plate, depending on the loop configuration adopted (S or omega) and to which mobile deflection axis or axes are attached springs which, upon pulling force on the strap tending to reduce the extent of the loop, generate a return reaction. The unit in itself is there only to keep all the pieces in position and allow for the guidance and then immobilization of the translation of the deflection axis or axes at the end of travel.

This effect of apparent elongation of the link/strap is obtained when pulling force is applied to the link/strap. The comfort unit also preferentially contributes an effect of apparent shortening (after elongation) of the link/strap when the pulling force ceases. These effects of apparent elongation and shortening of the link/strap relate to an overall effect of apparent elasticity of the link/strap.

Thus, the comfort unit has two particular configurations depending on the loop configuration adopted: S or omega.

In the S loop configuration, only one of the two strap deflection axes is mobile in translation. The corresponding device is represented in FIGS. 1 to 5. In this configuration, the continuous strap is passed into the comfort unit and it has an upstream part 1 and a downstream part 2 relative to the unit 3. The qualifiers "upstream" and "downstream" are here used purely arbitrarily and are given to facilitate the explanations. The upstream part 1 of the strap penetrates into the unit through an input/output end of the unit, in the case in point upstream 9, and will be wound over approximately a half turn around a fixed deflection axis 6 (not mobile in translation but which is, preferably, mobile in rotation) after having passed through most of the unit, then, the strap will be wound approximately 180° around a deflection axis 5 that is mobile in translation after having returned to the upstream input/output end of the unit, then the strap will leave through the other input/output end of the unit, in the case in point downstream 10, to form the downstream part 2 of the strap. If, preferably, the fixed deflection axis 6 is mobile in rotation, this can also be the case for the deflection axis that is mobile in translation 5.

In FIGS. 1 and 2, no significant pulling force is imposed on the strap between its upstream and downstream parts. The device is then at rest and the two deflection axes are spread apart from one another under the action of springs 7 acting on the two lateral ends of the deflection axis 5 that is mobile in translation, springs tending to pull said axis 5 toward the upstream input/output end 9 of the unit for the loop to have a maximum extent/extension.

In FIGS. 4 and 5, a pulling force is exerted on the straps between their upstream 1 and downstream 2 parts, for example because the wearer of a strap harness with comfort unit makes a movement. The strap then bears on the fixed deflection axis 6 and, by "pulley" principle, displaces the deflection axis 5 that is mobile in translation toward the fixed deflection axis 6, by countering the action of the springs 7, which reduces the extent of the loop and therefore generates an apparent elongation of the strap (the strap markers in the form of black lines move apart from one another). When the pulling force on the strap ceases, the springs 7 return the mobile deflection axis toward its initial position, which results in an increase in the extent of the loop and therefore causes an apparent shortening of the strap as represented in FIGS. 1 and 2.

FIG. 3 provides a better view of the structure of the comfort unit which is produced in two parts that fit together and snap fit one into the other and containing on the inside the deflection axes, fixed 6 and mobile in translation 5. The latter axis 5 is guided at its two ends in parallel grooves (or openings), a pair of grooves, of opposite walls of the unit. The springs 7 are extended between attachment structures of the unit and the axis that is mobile in translation 5.

Preferably, the strap has a substantially constant width over its entire length in order in particular to avoid any problems of deviation, folds or turnovers of the strap possibly hampering the operation of the comfort unit, in the case of non-axial pulling force on the strap for example. More generally, in order to improve the guidance of the link at the inputs/outputs of the unit and in the unit, the orifices for passage of the link at the input/output ends are adjusted to the size (width and thickness for a strap and diameter for a rope) of the link and the deflection axes may include lateral shoulders or grooves. As an example, a strap for a safety harness has a width of approximately 45 mm.

In the omega loop configuration, the two strap deflection axes are mobile in translation. The corresponding device is represented in FIGS. 6 to 10. In this configuration, the continuous strap is passed into the comfort unit and it has an upstream part 1 and a downstream part 2 relative to the unit 3. As previously, the qualifiers "upstream" and "downstream" are here purely arbitrary and given to facilitate the explanations. The upstream part 1 of the strap penetrates into the unit through an input/output end of the unit, in the case in point, upstream 9, and will be wound by approximately a half turn around a first deflection axis that is mobile in translation 5, then, the strap will be wound approximately 180° around a first end of a reaction plate 8 then be wound approximately 180° around the second end of said reaction plate 8 to then be wound over approximately a half turn around a second deflection axis 5' which is mobile in translation, then the strap will leave through the other input/output end of the unit, in the case in point, downstream 10, to form the downstream part 2 of the strap. In variants, the deflection axis or axes that is/are mobile in translation 5, 5' is/are also mobile in rotation.

It will be clearly understood that, the main function of the bearing plate 8 being to provide at its two ends deflection means for the path of the strap, said plate may be replaced, for example, by two other so-called omega deflection axes, fixed, arranged at the placements of the ends of the reaction plate. However, the small thickness of the reaction plate makes the possibility of sliding the strap, and therefore the possibilities of displacing the comfort unit along the strap, more difficult, so such a reaction plate can therefore be used if there is a desire to make the displacement of the comfort unit more difficult.

Preferably, a means is implemented that makes it possible to immobilize the comfort unit relative to the strap, totally or within a certain limit, in order to prevent it from being (excessively) displaced and from being able to finally come to be positioned at placements that are a hindrance to the wearer of the harness.

In FIGS. 6 and 7, no significant pulling force is imposed on the strap between its upstream 1 and downstream 2 parts. The device is then at rest and the two deflection axes are close to one another under the action of springs 7, two in the case in point, acting between the side ends of the deflection axes 5, 5' that are mobile in translation, springs tending to bring together said axes 5, 5' so that the loop has a maximum extent/extension.

In FIGS. 9 and 10, a pulling force is exerted on the straps between their upstream 1 and downstream 2 parts, for example because the wearer of a strap harness with comfort unit makes a movement. The strap then bears on the reaction plate 8 and, by "pulley" principle, displaces, by moving them apart, the deflection axes 5 and 5' that are mobile in translation by countering the action of the springs 7, which reduces the extent of the loop and therefore results in an apparent elongation of the strap (the strap markers in the form of black lines move away from one another). When the pulling force on the strap ceases, the springs return the mobile deflection axes toward their initial positions, which results in an increase in the extent of the loop and therefore causes an apparent shortening of the strap as represented in FIGS. 6 and 7.

As has been seen, the unit typically consists of two shells joined together. Preferably, one of the shells forms the greater part of the unit 3 and the other shell then forms a cover 4. The structure of the unit with omega loop can be better seen in FIG. 8 with its two parts fitting together and snap fitting into one another and containing the deflection axes that are mobile in translation 5 and 5' and the reaction plate 8. The deflection axes 5 and 5' that are mobile in translation are guided at their two ends in two pairs of mutually parallel grooves in opposite walls of the unit. The springs 7 are extended between the deflection axes that are mobile in translation 5 and 5'.

In the examples described, the link concerned, which is a strap in this case, leaves from each side of the device. In a variant, one end of the link can be fixed to the device and the device includes a specific attachment means (hook, fish tail anchor, screw anchor, spring hook, etc.) thus enabling a pulling force to be exerted on the link. Also, a rest state of the device has been mentioned as corresponding to a maximum loop extent in the absence of pulling force on the link. It will, however, be understood that, in certain applications, the link is normally tensioned (the extent of the loop is then reduced) and that the device then serves to compensate (reduce the apparent length of the link) a lowering of the tension of the link. In other applications, the tension on the link is normally such that the extent of the loop is between the minimum and the maximum extent of the loop, and it is then possible to compensate in both directions the apparent length of the link depending on whether the tension is increased or reduced. Furthermore, the deflection axes, fixed (including omega) or mobile, may or may not be mobile in rotation depending on the method of production. Preferably, the unit does not have any external sharp edges because it is in contact with the user.

An application of the comfort unit to an anti-fall safety harness is represented in FIGS. 11 and 12. In this application, a comfort unit is arranged on each of the shoulder straps of the harness, in the back of the user. Preferably, a means of immobilizing the comfort unit along the strap is implemented in order for the latter not to be displaced (excessively) along the strap when using the harness. The straps of the harness are preferably non-extendable (made of a non-elastic material) in this application and the comfort unit contributes an apparent elasticity to the shoulder straps.

The invention claimed is:

1. A device for adjusting the length of a flexible link according to a pulling force exerted on said link, said continuous link passing through the device between two substantially opposite input/output ends of said device, the device comprising:

means for producing at least one link loop whose extent can vary according to the pulling force; and at least one return means tending to increase the extent of said loop up to a predefined maximum in the absence of the pulling force on said link, which corresponds to a reduction of the apparent length of the link on which the device is placed, the pulling force of the link resulting in a reduction of the extent of the loop up to a predefined minimum, which corresponds to an elongation of the apparent length of the link on which the device is placed, wherein the device is reversible, the cessation of the pulling force returning the extent of said loop to the predefined maximum, said loop being substantially flat and extending in a substantially extended plane between the two input/output ends of the device, wherein the device includes, for each loop, at least two link deflection rods around which the link is at least partially wound to change a direction of the link, in order that the device is free to displace along the link and to form the loop, at least one of the rods being mobile in translation and being functionally attached to said at least one return means, said at least one of said rods being movable toward and away from another of said rods to vary the extent of the loop, and wherein the return means is a spring and the spring works by extension, the pulling force of the link which results in a reduction of the extent of the loop causing an extension of the spring.

2. The device as claimed in claim 1, wherein the link is one of a cylindrical link and a flat link.

3. A strap harness comprising the device according to claim 2.

4. The device as claimed in claim 2, wherein the loop is an S loop, a first one of the deflection rods being immobilized in translation and a second one of the deflection rods being mobile in translation and functionally attached to said at least one return means, the return means acting between one or more fixed points of the device and the second one of the deflection rods.

5. The device as claimed in claim 2, wherein the loop is an omega loop, a first one of the deflection rods being mobile in translation and functionally attached to a first of said at least one return means, and a second one of the deflection rods being mobile in translation and functionally attached to a second of said at least one return means, and wherein when the first and the second at least one return means are independent, said return means act respectively between one or more fixed points of the device and their corresponding one of the deflection rods and wherein when the first and the second at least one return means are at least one and the same return means, said return means act between the first and second ones of the deflection rods.

6. The device as claimed in claim 1, wherein the loop is an S loop, a first one of the deflection rods of the link being immobilized in translation and a second one of the deflection rods being mobile in translation and functionally attached to said at least one return means, the return means acting between one or more fixed points of the device and the second one of the deflection rods.

7. The device as claimed in claim 1, wherein the loop is an omega loop, a first one of the deflection rods of the link being mobile in translation and functionally attached to a first of said at least one return means, and a second one of the deflection rods being mobile in translation and functionally attached to a second of said at least one return means, and wherein when the first and the second at least one return means are independent, said return means act respectively between one or more fixed points of the device and their corresponding deflection rods, and wherein when the first and the second at least one return means are at least one and the same return means, said return means act between the first and second ones of the deflection rods.

8. The device as claimed in claim 7, further comprising one of a reaction plate and two fixed omega deflection axes.

9. The device as claimed in claim 1, further comprising two parallel and opposite translation paths for each of the deflection rods that is mobile in translation, said translation paths receiving two opposite ends of the respective deflection rods in order to allow mobility with translational guidance of said respective deflection rod.

10. The device as claimed in claim 1, wherein the device is a substantially flat unit, the loop being arranged inside said unit.

11. The device as claimed in claim 10, wherein said flat unit comprises two shells joined together, each of the shells forming one of two main faces of said unit.

* * * * *